US006394035B1

(12) United States Patent
Hill

(10) Patent No.: US 6,394,035 B1
(45) Date of Patent: May 28, 2002

(54) PET ENCLOSURE WITH RETRACTABLE ACCESS TUNNEL

(76) Inventor: Thomas C. Hill, 41845 Driver La., Temecula, CA (US) 92591

( * ) Notice: Subject to any disclaimer, the term of this patent is extended or adjusted under 35 U.S.C. 154(b) by 0 days.

(21) Appl. No.: 09/803,279

(22) Filed: Mar. 9, 2001

(51) Int. Cl.$^7$ .............................. A01K 1/03; A01K 1/035
(52) U.S. Cl. ..................................... 119/484; 119/482
(58) Field of Search ................................. 119/482, 484, 119/485; 49/163

(56) References Cited

U.S. PATENT DOCUMENTS

| 4,021,975 A | 5/1977 | Calkins ........................ 119/484 |
| 4,224,899 A | 9/1980 | Cruchelow et al. .......... 119/484 |
| 4,291,645 A | 9/1981 | Cruchelow et al. .......... 119/484 |
| 4,788,934 A | 12/1988 | Fetter ........................... 119/484 |
| 4,989,546 A | 2/1991 | Cannaday ..................... 119/484 |
| 4,995,336 A | 2/1991 | Deemer et al. ............... 119/484 |
| 5,092,277 A | * 3/1992 | Baillie et al. ................. 119/484 |
| 5,195,457 A | 3/1993 | Namanny ...................... 119/484 |
| 5,261,350 A | 11/1993 | Vavrek .......................... 119/484 |
| 5,649,500 A | * 7/1997 | Klavemann et al. .......... 119/484 |
| 5,937,792 A | 8/1999 | Madrid .......................... 119/482 |
| 5,946,855 A | 9/1999 | Miconi .......................... 49/163 |
| 5,975,017 A | 11/1999 | Cameron ....................... 119/484 |
| 6,029,609 A | * 2/2000 | Bahar et al. .................. 119/484 |

* cited by examiner

Primary Examiner—Charles T. Jordan
Assistant Examiner—Elizabeth Shaw
(74) Attorney, Agent, or Firm—Henderson & Sturm LLP

(57) ABSTRACT

A pet enclosure (10) for use with a door (100) equipped with a pet portal (101) wherein the pet enclosure member (10) includes an enclosure member (20) provided with a plurality of panels (21) (22) (23) etc., wherein one of the panels (25) is disposed adjacent to the door (100) and provided with an access opening (28) that is dimensioned to slidably receive an access tunnel unit (12) that is pivotally disposed within the enclosure member (20) and adapted to engage the pet portal (101) when the door (100) is closed and be retracted within the enclosure member (20) when the door (100) is fully open.

10 Claims, 3 Drawing Sheets

US 6,394,035 B1

PET ENCLOSURE WITH RETRACTABLE ACCESS TUNNEL

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of pet enclosures attached to a dwelling in general, and in particular to a pet enclosure having a retractable access tunnel.

2. Description of Related Art

As can be seen by reference to the following U.S. Pat. Nos. 4,224,899; 4,291,645; 4,788,934; 4,995,336 and 5,946,855, the prior art is replete with myriad and diverse pet enclosures having direct access to a dwelling.

While all of the aforementioned prior art constructions are more than adequate for the basic purpose and function for which they have been specifically designed, they are uniformly deficient with respect to their failure to provide a simple, efficient, and practical pet enclosure having a pivoted access tunnel associated with a conventional pet door portal.

As most pet owners in general, and cat owners in particular are aware, most pets prefer to have a designated sleeping and eating area that is somewhat segregated or isolated from the rest of the domicile.

In addition, particularly in the case of felines, the owners in most instances find the odor from litter boxes to be extremely disagreeable and preferably isolated from those areas that are frequented by the resident of the dwelling.

As a consequence of the foregoing situation, there has existed a longstanding need among cat owners in particular for a new and improved pet enclosure that can be situated at a remote location relative to a dwelling yet directly connected to the dwelling via a moveable access tunnel; and, the provision of such an arrangement is the stated objective of the present invention.

BRIEF SUMMARY OF THE INVENTION

Briefly stated, the pet enclosure that forms the basis of the present invention comprises in general a main enclosure unit, an access tunnel unit and a pivot mechanism operatively connected between the access tunnel unit and a door disposed adjacent the pet enclosure to rotate the access tunnel unit into a closed position to prevent a pet from escaping from the enclosure unit when the door is opened.

As will be explained in greater detail further on in the specification, the enclosure unit is positioned near an inwardly swinging door equipped with a pet portal such that one of the side panels of the enclosure unit will have an access opening located adjacent the door.

In addition, an access tunnel unit including an open ended housing member is slidably received in the access opening and mounted for pivotal movement relative to the enclosure unit via the pivot mechanism; such that one end of the housing member is adapted to engage the pet portal when the door is in the fully open position, and the other end of the housing member is adapted to engage the interior of the enclosure unit to prevent the pet from escaping from the enclosure unit when the door is in the fully open position.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
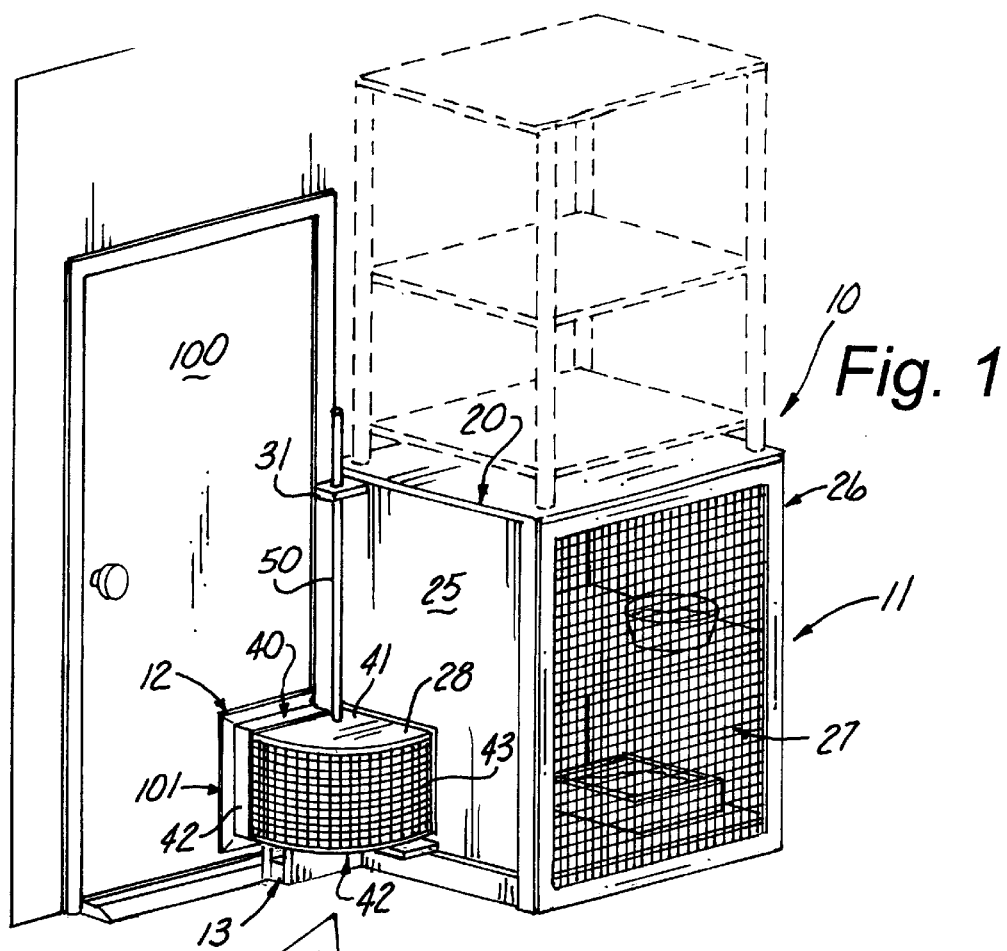
FIG. 1 is a perspective view of the pet enclosure positioned next to a closed inwardly swinging door equipped with a pet portal.
Figure 2:
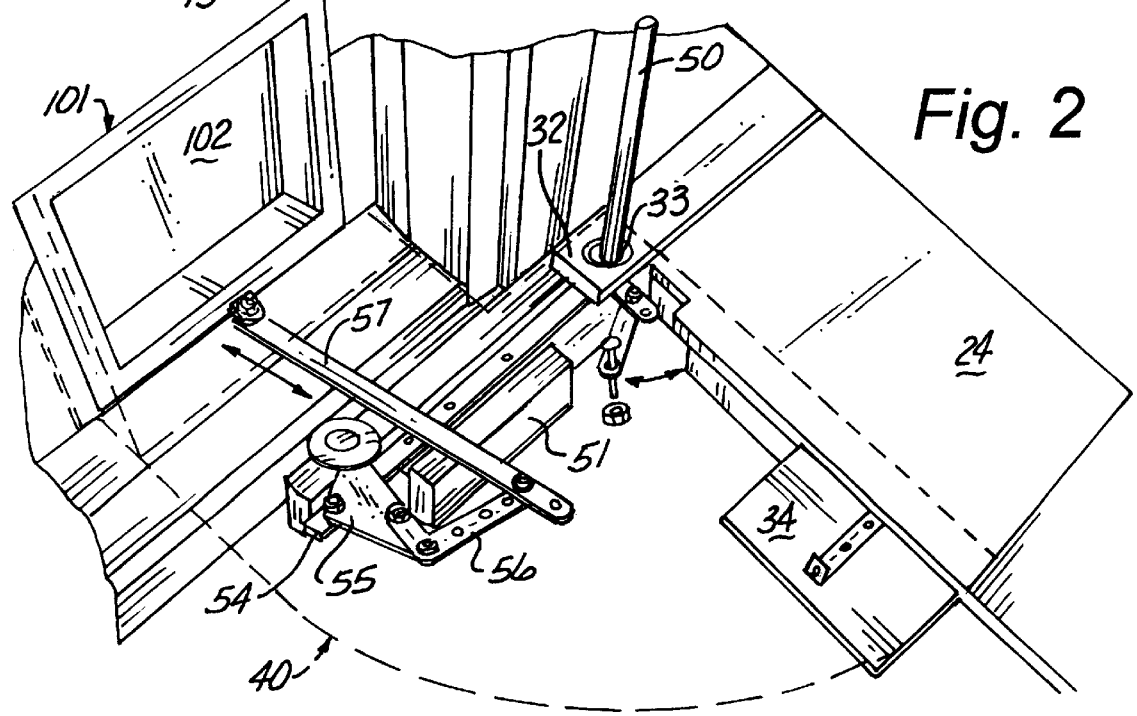
FIG. 2 is an isolated perspective view of the pivot mechanism when the dwelling door is in the closed position.

As can be seen by reference to the drawings, and in particular to FIGS. 1 and 2, the pet enclosure that forms the basis of the present invention is designated generally by the reference number 10. The pet enclosure 10 comprises in general an enclosure unit 11, an access tunnel unit 12, and a pivot mechanism 13. These structural components will now be described in seriatim fashion.

Prior to embarking on a detailed description of the pet enclosure 10, it would first be advisable to describe the environment in which this invention is specifically designed to operate.

As shown in FIGS. 1 and 2, the enclosure unit 11 is installed proximate to a door 100 equipped with a conventional pet portal 101 having a flap closure 102 that provides access and egress therethrough in a well recognized fashion relative to a dwelling.

Figure 3:
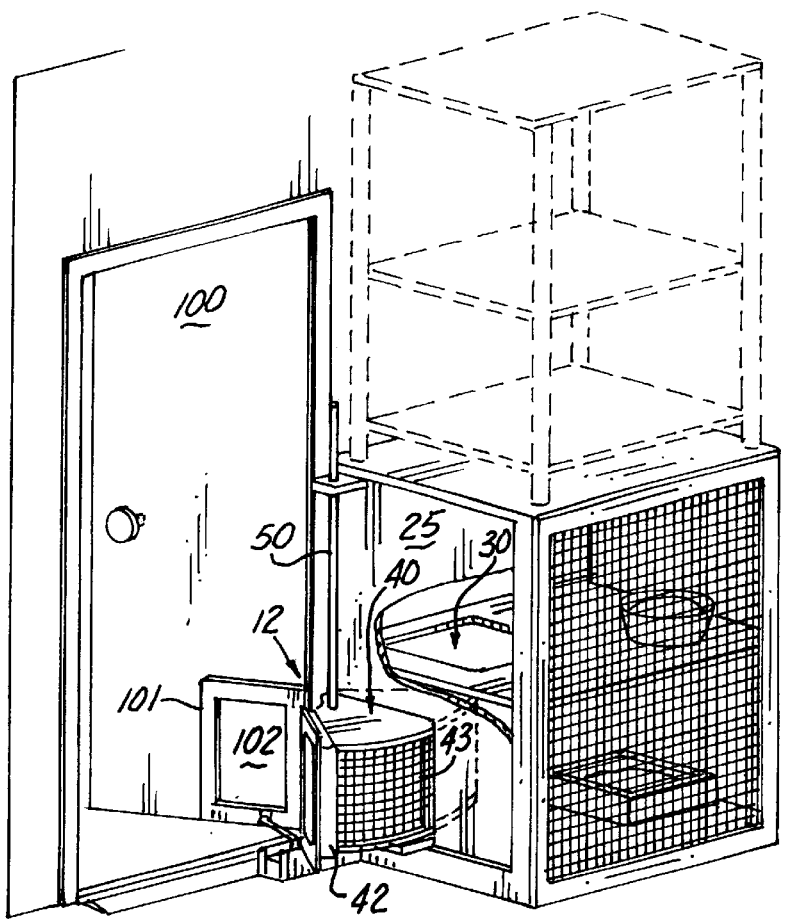
FIG. 3 is a perspective view of the pet enclosure when the dwelling door is partially opened.
Figure 5:
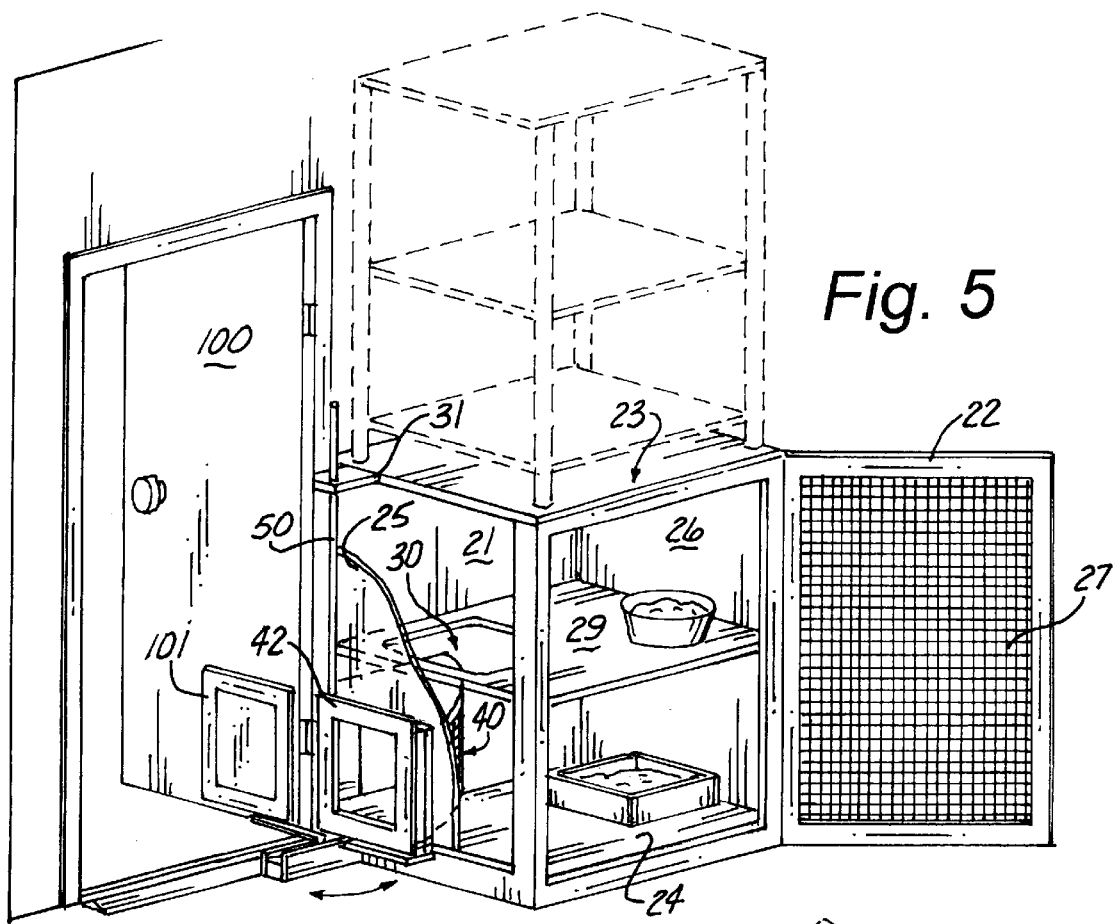
FIG. 5 is a perspective view of the pet enclosure when the dwelling door is fully opened.

Turning now to FIGS. 1, 3, and 5, it can be seen that the enclosure unit 11 comprises a generally rectangular enclosure member 20 having a rear panel 21, a hinged front panel 22, a top panel 23, a bottom panel 24, and a pair of side panels 25 26 wherein at least one of the opposed side panels 25 26 or the front panel is provided with an open mesh screen element 27 and one of the side panels 25 26 is provided with an access opening 28.

In addition, the enclosure member 20 may optionally be provided with an interior shelf 29 that divides the interior of the enclosure member 20 into an upper and a lower compartment; wherein, the interior shelf 29 is provided with an opening 30 that allows the pet to travel between the upper and lower compartments which serve as the eating/sleeping area and the litter box area respectively of the enclosure member 20.

As can also be seen by reference to FIGS. 1 and 2, the side panel 25 of the enclosure member 20 that has the access opening 28 is further provided with a pair of vertically spaced support arms 31 and 32 provided with aligned apertures 33 and an outwardly projecting support shelf 34 whose purpose and function will be described presently.

Returning once more to FIGS. 1, 3 and 5, it can be seen that the access tunnel unit 12 comprises in general an open ended curved housing member 40 having arcuate top 41 and bottom 42 panels operatively connected to one another by a curved screened panel 43; wherein the curved housing member 40 is dimensioned to be slidably received in the access opening 28 in the enclosure member 20 as will be explained in greater detail further on in the specification.

Furthermore, the outboard open end of the curved housing member 40 is provided with a docking portal 42 that is adapted to be moved into face to face engagement with the pet portal 101 in the dwelling door 100 when the door 100 is in the closed position; and, the open inboard end of the curved housing member 40 is adapted to engage the rear panel 25 of the enclosure member 20 when the door 100 is in the fully open position. This last feature not only prevents a pet from escaping from the enclosure member 20 when the dwelling door 100 is open, but also retracts the access tunnel unit 12 relative to the enclosure unit 11 to provide unimpeded travel through the dwelling door 100.

Figure 4:
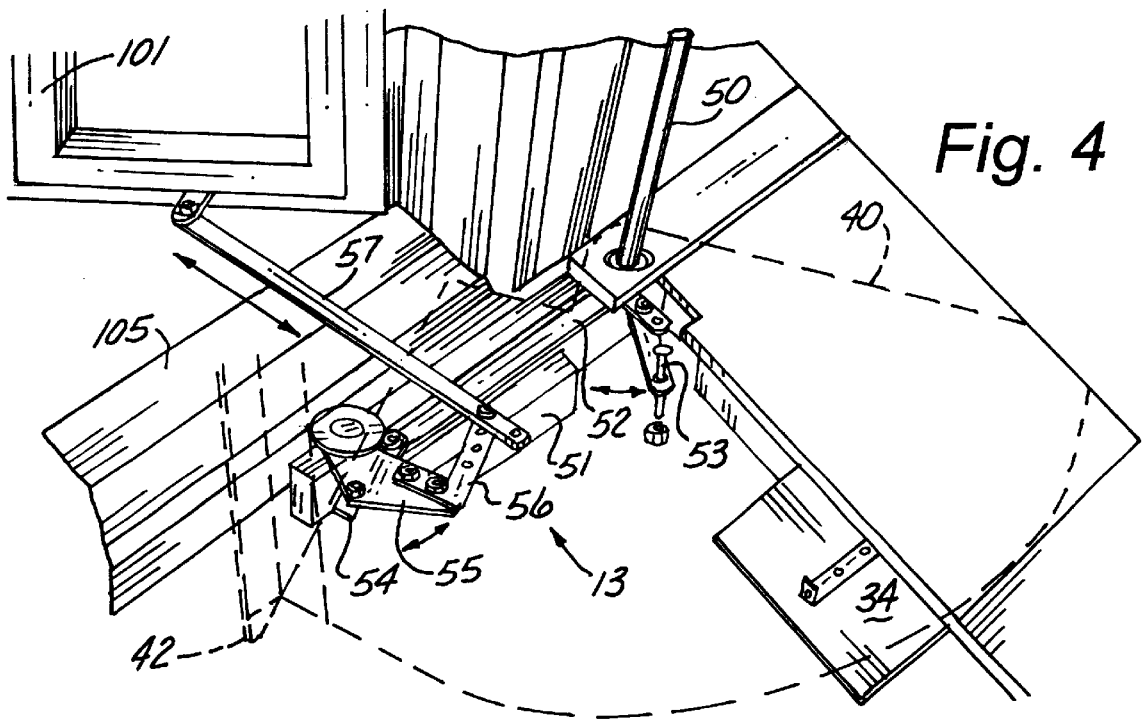
FIG. 4 is an isolated perspective view of the pivot mechanism when the dwelling door is partially opened.
Figure 6:
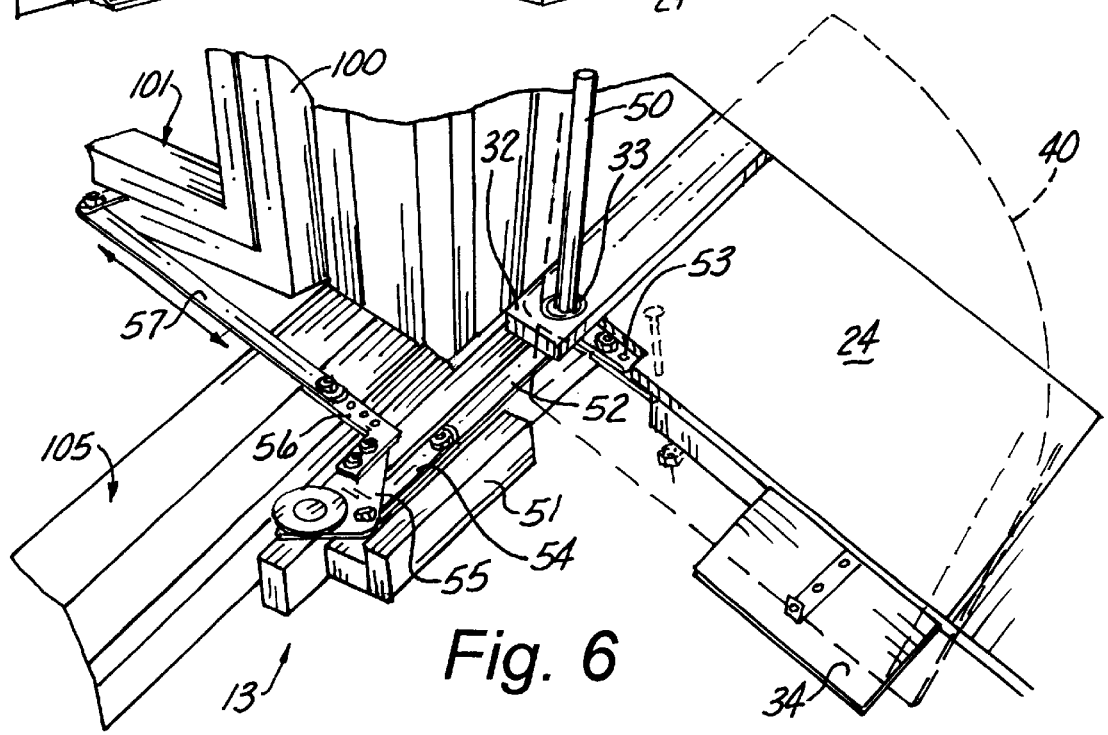
FIG. 6 is an isolated perspective view of the pivot mechanism when the dwelling door is fully opened.

Turning now to FIGS. 2, 4 and 6, it can be seen that the pivot mechanism 13 comprises in general an elongated pivot rod 50 that extends downwardly through the apertured support arms 31 32 as well as through aligned apertures (not shown) formed in both the top 41 and bottom 42 panels in the pivoted housing member 40 depicted in phantom.

Furthermore, the pivot mechanism 13 includes a channeled guide element 51 which projects outwardly from the floor panel 24 of the enclosure member 20 and is disposed adjacent to the threshold 105. The guide element 51 is further dimensioned to reciprocatingly receive a first generally L-shaped lever arm 52 having an inboard end provided with a pivoted extension arm element 53 that is affixed to the bottom panel 24 of the access housing member 40; wherein, the outboard end of the first lever arm 52 is further provided with another pivoted extension arm element 54 that is pivotally connected to a generally triangular shaped rocker arm element 55 which is in turn pivotally connected to the channeled guide element 51.

In addition, the rocker arm 55 is fixedly secured to one end of a generally L-shaped bracket 56 whose other end is pivotally secured to a second generally straight lever arm 57 whose outboard end is pivotally connected to the bottom of the inwardly opening dwelling door.

At this juncture, it should be appreciated that the pivot mechanism 13 is arranged such that when the door 100 is in the fully closed position, as depicted in FIG. 2, the access tunnel unit 12 is in the fully extended mode wherein the access portal 42 is disposed flush against the pet portal 101 to provide unimpeded access between the pet portal 101 and the interior of the enclosure member 20.

However, as the door 100 is opened, the access tunnel unit 12 is retracted within the enclosure member 20 under the influence of the pivot mechanism 13 such that when the door 100 is fully open, the inboard end of the housing member 40 is disposed flush against the rear panel 21 of the enclosure member,20 to prevent the egress of the pet through the access tunnel unit 12 which is fully retracted within the enclosure unit 11 to allow unimpeded passage through the door 100.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

I claim:

1. A pet enclosure for use with a door having a pet portal wherein the pet enclosure comprises:
    an enclosure unit including an enclosure member having a plurality of panels wherein at least one of the plurality of panels is provided with a screen element and one of the plurality of panels is proved with an access opening and disposed adjacent said door;
    an access tunnel unit including an open-ended, curved housing member dimensioned to be slidably received in said access opening in the enclosure member wherein the housing member has one open end adapted to engage said pet portal and the other open end is adapted to engage one of said plurality of panels of the enclosure member; and
    a pivot mechanism operatively associated with the access tunnel unit and said door for engaging said one end of the housing member with the pet portal when the door is in the closed position and retracting the housing member within the enclosure member to bring the other end of the housing member into engagement with one of said plurality of panels of the enclosure member.

2. The pet enclosure as in claim 1, wherein said plurality of panels include: a top panel, a bottom panel, a front panel, a rear panel, and a pair of opposed side panels.

3. The pet enclosure as in claim 2, wherein said access opening is provided in one of said pair of opposed side panels.

4. The pet enclosure as in claim 3, wherein the front panel is provided with a screen element.

5. The pet enclosure as in claim 4, wherein the enclosure member is further provided with an interior shelf having an opening wherein the shelf divides the interior of the enclosure member into an upper compartment and a lower compartment.

6. The pet enclosure as in claim 5, wherein said front panel is hinged relative to one of the other of the plurality of panels.

7. The pet enclosure as in claim 1, wherein said curved housing member is mounted for pivotal movement relative to said enclosure member.

8. The pet enclosure as in claim 7, wherein said pivot mechanism comprises:
    a rocker panel having a first end, an intermediate portion, and a second end;
    a first lever arm having one end operatively associated with the housing member and the other end pivotally connected to the intermediate portion of the rocker panel; and
    a second lever arm having one end operatively associated with said door and the other end pivotally connected to the first end of the rocker panel, wherein the second end of the rocker panel is pivotally associated with a portion of the enclosure member.

9. The pet enclosure as in claim 8, wherein the enclosure member is provided with an outwardly projecting channeled guide element which is dimensioned to slidably receive said first lever arm.

10. The pet enclosure as in claim 9, wherein the second end of the rocker panel is pivotally connected to said channeled guide element.

* * * * *